United States Patent
Okada

(10) Patent No.: US 7,888,833 B2
(45) Date of Patent: Feb. 15, 2011

(54) MOLDED MOTOR

(75) Inventor: Takeshi Okada, Fukui (JP)

(73) Assignee: Nidec Shibaura Corporation, Fukui (JP)

( * ) Notice: Subject to any disclaimer, the term of this patent is extended or adjusted under 35 U.S.C. 154(b) by 344 days.

(21) Appl. No.: 11/843,795

(22) Filed: Aug. 23, 2007

(65) Prior Publication Data

US 2008/0042499 A1  Feb. 21, 2008

(51) Int. Cl.
*H02K 5/02* (2006.01)
(52) U.S. Cl. .......................... 310/89; 310/68 R; 310/43
(58) Field of Classification Search ............... 310/68 R, 310/43, 89, 90, 90.5
See application file for complete search history.

(56) References Cited

U.S. PATENT DOCUMENTS

| | | | | |
|---|---|---|---|---|
| 3,633,055 | A * | 1/1972 | Maier | 310/156.26 |
| 4,267,461 | A | 5/1981 | Grassmann | |
| 6,577,031 | B2 * | 6/2003 | Morooka et al. | 310/68 R |
| 6,819,018 | B2 * | 11/2004 | Melfi | 310/68 R |
| 7,012,346 | B2 * | 3/2006 | Hoffman et al. | 310/43 |
| 2003/0222515 | A1 * | 12/2003 | Ueda et al. | 310/43 |
| 2005/0253480 | A1 * | 11/2005 | Pizzichil | 310/261 |
| 2005/0285464 | A1 * | 12/2005 | Orders et al. | 310/88 |

FOREIGN PATENT DOCUMENTS

| | | |
|---|---|---|
| JP | 53-131410 A2 | 11/1978 |
| JP | 61-017848 U | 2/1986 |
| JP | 62-159143 U | 10/1987 |
| JP | 4-114751 U | 10/1992 |
| JP | 06-133489 A2 | 5/1994 |
| JP | 10-032953 A2 | 2/1998 |
| JP | 2002-218697 A2 | 8/2002 |
| JP | 2003-199285 A2 | 7/2003 |
| JP | 2003-235213 A | 8/2003 |
| JP | 2004-048829 A | 2/2004 |
| JP | 2004-104868 A2 | 4/2004 |
| JP | D1203465 S | 4/2004 |
| JP | D1206000 S | 5/2004 |
| JP | 2004-229429 A2 | 8/2004 |
| JP | 2004-350384 A | 12/2004 |

OTHER PUBLICATIONS

Third Party Submission filed in Japanese Application 2005-200966, on Oct. 23, 2008.
Third Party Submission field in Japenese Application 2005-200966, on Oct. 28, 2008.
Third Party Submission filed in Japanese Application 2005-200966, on Nov. 21, 2008.
Third Party Submission filed in Japanese Application 2005-200966, on Jun. 8, 2009.

* cited by examiner

*Primary Examiner*—Quyen Leung
*Assistant Examiner*—Naishadh N Desai
(74) *Attorney, Agent, or Firm*—Keating & Bennett, LLP

(57) ABSTRACT

An inner rotor type molded motor controlled by pulse width modulation using an inverter circuit includes a pair of electrically conductive brackets attached to a load-side portion and an anti-load-side portion of a motor frame. An electrically conductive tape is attached on the outside of the motor frame to extend between the brackets, thereby short-circuiting the brackets to each other. In this manner, electrical erosion in the molded motor can be prevented.

9 Claims, 2 Drawing Sheets ated by ball bearings dis-
MOLDED MOTOR

BACKGROUND OF THE INVENTION

1. Field of the Invention

The present invention relates to an inner rotor type molded motor.

2. Description of the Related Art

A known molded motor has a motor frame made of insulating molding resin covering a stator, and a rotor is disposed on a center-axis side of the stator in a rotatable manner. The stator includes a stator core and a coil formed around a portion of the stator core which serves as a main magnetic path. The rotor includes a shaft centered on the center axis of the molded motor. The shaft is supported by ball bearings disposed at or near axial ends of the stator. Since the resin molding the stator forms the motor frame, the molded motors do not require a component that functions or defines an outer casing of the motor. Thus, the number of the components of the molded motor and the manufacturing cost thereof can be reduced.

Typical molded motors use brushless DC motors. The brushless DC motors are usually controlled by pulse width modulation (hereinafter, simply referred to as PWM) control using an inverter circuit.

PWM control may cause electrical erosion in molded motors using brushless DC motors. This is because potentials at brackets which are usually made of metal and support the bearings, respectively, are "floating" with respect to the molding resin forming the motor frame and are therefore unstable.

In a case where a power-supply voltage is switched at high frequencies as in PWM control, for example, a potential at a load-side bracket and a potential at an anti-load-side bracket may become different due to a change in a distance between the stator and the rotor or due to a voltage change at a neutral point of a bridge circuit caused by PWM control. Thus, a potential difference is generated between an outer ring of the load-side ball bearing of the same potential as the load-side bracket and an outer ring of the anti-load-side ball bearing of the same potential as the anti-load-side bracket, resulting in a circulation current flowing through inner rings of the respective ball bearings and the shaft of the rotor. This circulation current causes discharge between the inner ring and the outer ring in each of ball bearing. The discharge makes surfaces of the inner ring, the outer ring, and a ball uneven or rough in each ball bearing. The ball bearing having an uneven or rough surface generates an abnormal sound, and the life thereof is shortened.

SUMMARY OF THE INVENTION

According to preferred embodiments of the present invention, a molded motor having a center axis is provided. In the molded motor, a stator is covered by insulating molding resin which defines a motor frame. Electrically conductive brackets are attached to both ends of the motor frame. A bearing is disposed on each bracket. A rotor is disposed on a center-axis side of the stator and includes a shaft which is supported by the bearings. Thus, the rotor can be rotated about the center axis. The motor frame is provided with an electrically conductive member arranged to electrically connect the brackets to each other. That is, the electrically conductive member short-circuits the brackets to each other.

With this structure, potentials at the electrically conductive brackets disposed at both ends of the motor frame are equal to each other because the brackets are electrically connected to the electrically conductive member. Thus, even if the potentials at the brackets are changed while the molded motor is controlled by PWM control using an inverter circuit, the potentials at the brackets are kept equal to each other by the electrically conductive member. That is, no circulation current flows through the brackets, the bearings, and the shaft.

The electrically conductive member may be formed by an electrically conductive tape disposed on an outer surface of the motor frame. Alternatively, the electrically conductive member may be wire-shaped or plate-shaped.

One of the brackets may be embedded in the motor frame of the molded motor when the motor frame is molded. Especially in a case where a load-side portion of the shaft of the rotor projects outside the motor frame, a portion of the load-side bracket may be embedded into the motor frame. In this case, a securing strength of the bracket having the portion embedded in the motor frame can be increased. Thus, it is possible to hold the load-side portion of the shaft more firmly.

The motor frame may be provided with a control circuit that is arranged to supply electrical power from an external DC power supply to a coil of the stator and controlling the electrical power. In this case, the control circuit may be constructed by mounting one or more electric components on a wiring board, and may be molded together with the stator by the molding resin forming the motor frame. Moreover, the control circuit may control a current flowing through the coil by PWM control.

Other features, elements, advantages and characteristics of the present invention will become more apparent from the following detailed description of preferred embodiments thereof with reference to the attached drawings.

DETAILED DESCRIPTION OF PREFERRED EMBODIMENTS

Figure 1:
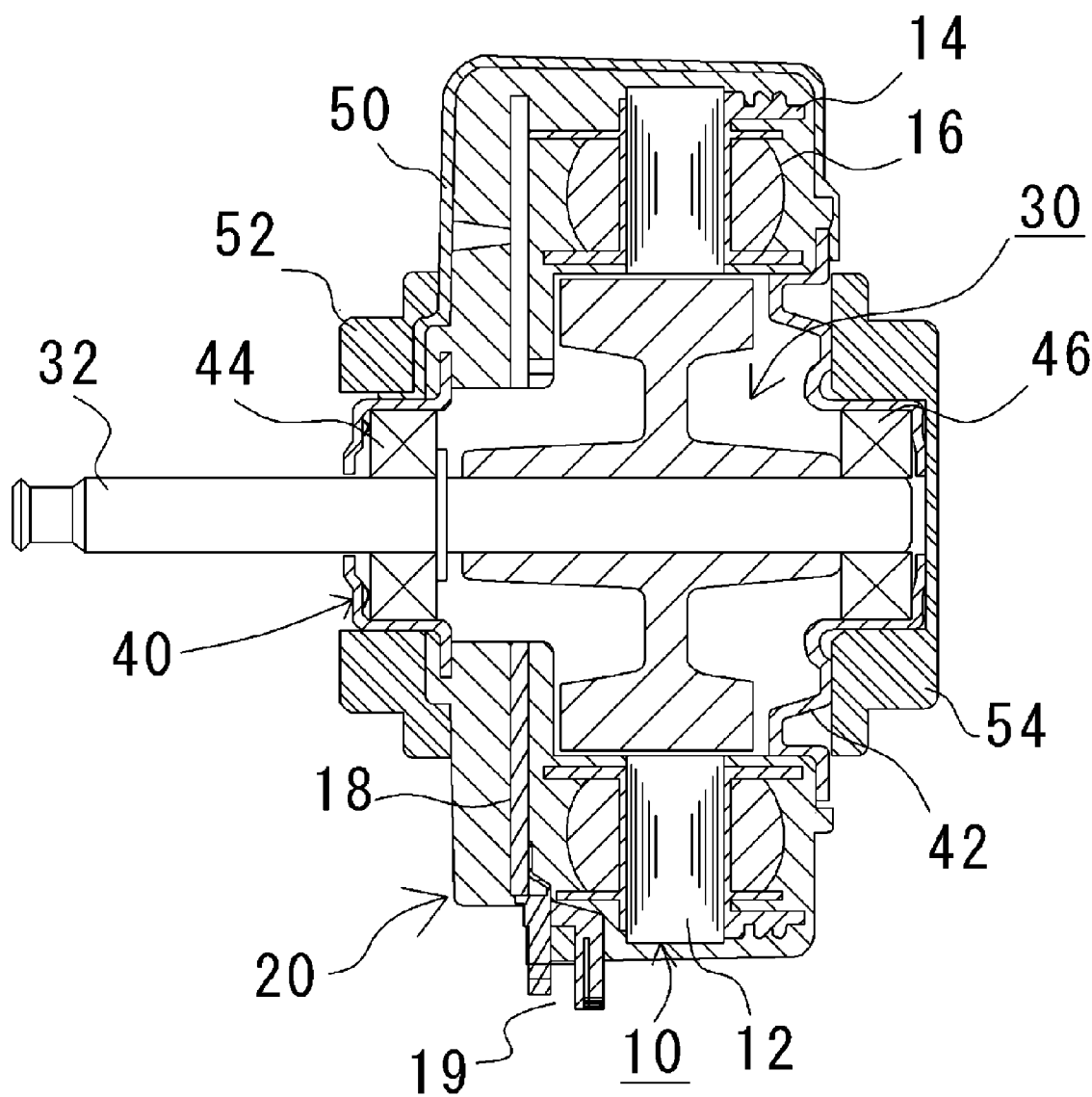
FIG. 1 is a cross-sectional view of a molded motor according to a preferred embodiment of the present invention.
Figure 2:
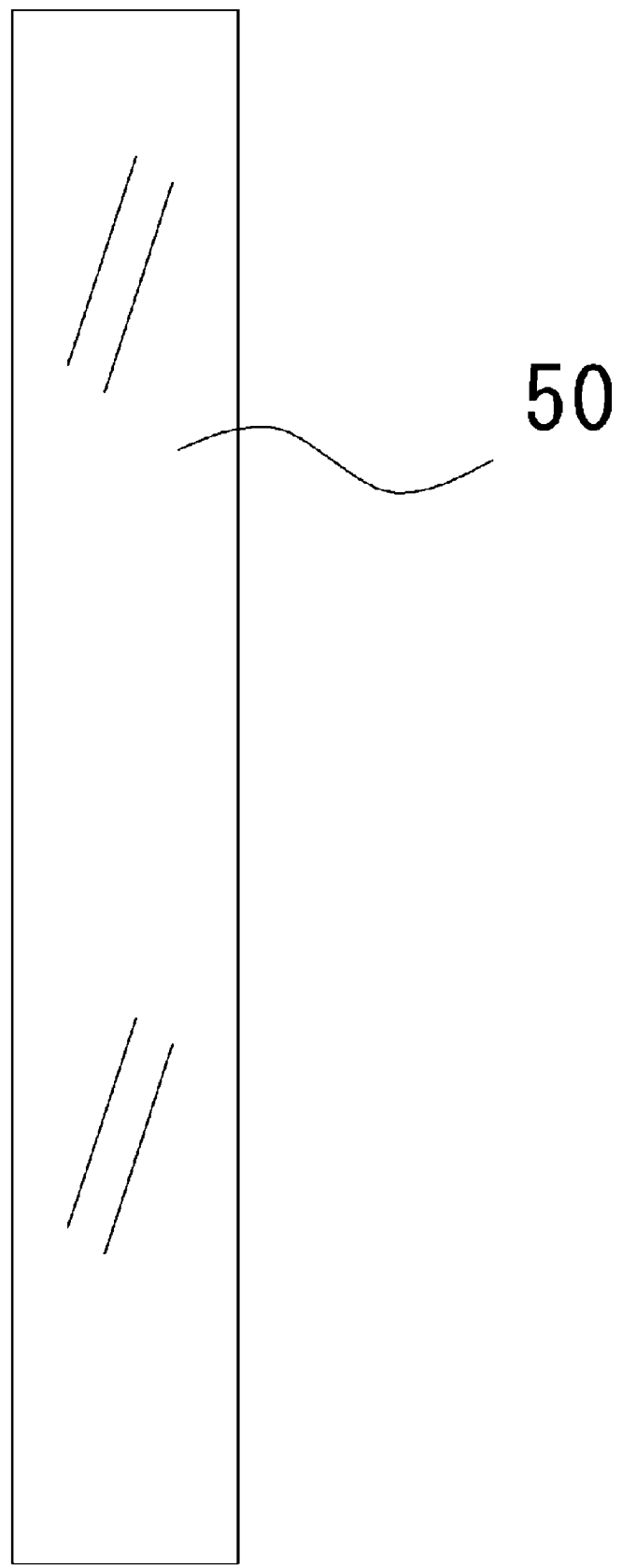
FIG. 2 is an enlarged view of an exemplary electrically conductive member provided in the molded motor of FIG. 1.

Referring to FIGS. 1 and 2, preferred embodiments of the present invention will be described in detail. It should be noted that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated. Meanwhile, in the following description, an axial direction indicates a direction parallel to a center axis of a motor, and a radial direction indicates a direction perpendicular to the rotation axis.

A molded motor according to a preferred embodiment of the present invention is now described referring to FIGS. 1 and 2.

In this preferred embodiment, the molded motor 1 preferably is a brushless DC motor. The molded motor 1 includes a motor frame 20 with a stator 10 secured thereto. A rotor 30 is arranged on a center axis side of the stator 10. The rotor 30 includes a shaft 32 centered on the center axis of the molded motor 1. The shaft 32 can rotate about the center axis. A portion including one axial end of the shaft 32 projects outside the motor frame 20. The projecting portion of the shaft 32 transmits a power (mechanical power) to an external device connected thereto. That is, the power is transmitted from the projection portion of the shaft 32 to a load. Thus, in the following description, a direction in which the shaft 32 projects is referred to a load side and the opposite direction is referred to an anti-load side.

The stator 10 includes a stator core 12, an insulating layer 14, and coils 16. In this preferred embodiment, the stator core 12 preferably is annular and is formed by stacking steel plates. The insulating layer 14 is formed on a surface of the stator core 12 by pre-molding, for example. The coils 16 are formed by winding a conductive wire around the stator core 12 with the insulating layer 14 interposed therebetween. The stator core 12 includes a core back portion which is an annular member, for example, and a plurality of magnetic pole portions each extending from the core back portion toward the shaft 32. More specifically, the insulating layer 14 is disposed at least on the respective magnetic pole portions. The coil 16 is arranged around a corresponding one of the magnetic pole portions with the insulating layer 14 interposed therebetween.

A wiring board 18, which is annular, for example, is disposed on the load side of the stator 10. The wiring board 18 is supported by a supporting wall formed by the insulating layer 14. One or more electric components forming a driving circuit for the molded motor 1 are mounted on the wiring board 18. The coils 16 of the stator 10 are connected to the electric components mounted on the wiring board 18. In this preferred embodiment, the molded motor 1 preferably is a brushless DC motor and is controlled by PWM control. Therefore, an inverter circuit and a logic circuit provided, for example.

The stator 10 and the wiring board 18 are molded with insulating molding resin together, thereby forming a motor frame 20 which is generally cylindrical in this preferred embodiment. The molding resin forming the motor frame 20 covers the stator 10 and the wiring board 18 except for a center-axis side surface of the stator core 12 (i.e., a center-axis side surface of each magnetic pole portion). That is, the center-axis-side surface of the stator core 12 is exposed on an inner circumference of the motor frame 20. The outer circumferential surface of the motor frame 20 defines an outer surface of the molded motor 1. A connector 19 is connected to the wiring board 18 and is supported by the motor frame 20 with its connection terminals exposed to the outside. Electrical power from an external power supply and a control signal are supplied to the connection terminals of the connector 19.

Brackets 40 and 42 are disposed on the load-side end and the anti-load-side end of the motor frame 20, respectively. The brackets 40 and 42 are made of electrically conductive material. In this preferred embodiment, the brackets 40 and 42 are annular and made of metal. The load-side bracket 40 is preferably in the form of a cap in which a load-side end of a cylindrical portion is bent radially inward and an anti-load-side end of the cylindrical portion is bent radially outward. A portion radially outside of a bending point of the load-side bracket 40, at which the bracket 40 is bent radially outward, is embedded in the motor frame 20 by insertion molding when the motor frame 22 is formed. Thus, the load-side bracket 40 is secured to the motor frame 20.

The anti-load-side bracket 42 has a shape substantially formed by a cover portion which closes an anti-load-side opening of the motor frame 20 and a cylindrical portion formed at the center of the cover portion. In this preferred embodiment, the cylindrical portion of the bracket 42 extends from the cover portion to the anti-load side, as shown in FIG. 1. Between the shaft 32 and the cylindrical portion of the bracket 42 is accommodated a bearing 46 described later. A radially outer peripheral portion of the cover portion of the bracket 42 is fitted into an opening formed in a radially inner portion of the anti-load-side end portion of the motor frame 20. Thus, the bracket 42 is secured to the motor frame 20. It should be noted that the cover portion of the bracket 42 may have any shape as long as it closes the anti-load-side opening of the motor frame 20.

The rotor 30 is accommodated inside the motor frame 20. The rotor 30 is provided with the shaft 32 as described above, which is made of metal, for example. The shaft 32 is supported in a rotatable manner by a bearing 44 held by the cylindrical portion of the load-side bracket 40 and a bearing 46 held by the cylindrical portion of the anti-load-side bracket 42. The load-side portion of the shaft 32 projects toward the load side from the bearing 44, while the anti-load-side portion of the shaft 32 does not project toward the anti-load side from the bearing 46.

An electrically conductive member 50 is arranged to extend between the load-side bracket 40 and the anti-load-side bracket 42. The electrically conductive member 50 preferably is an electrically conductive tape in this preferred embodiment. More specifically, the electrically conductive tape 50 as shown in FIG. 2 is attached to the outer surface of the motor frame 20 so as to extend along an axial direction which is substantially parallel to the shaft 32. One end of the electrically conductive tape 50 is attached to the outer surface of the cylindrical portion of the load-side bracket 40, while the other end is attached to the outer surface of the cover portion of the anti-load-side bracket 42. In this manner, both the brackets 40 and 42 are short-circuited. It is preferable that the electrically conductive tape be made of aluminum, for example.

Returning to FIG. 1, elastic members 52 and 54 for reducing vibration are disposed on the load side and the anti-load side of the motor frame 20. In this preferred embodiment, rubber members are preferably used as the elastic members 52 and 54. The load side elastic member 52 is generally annular and is fitted and secured to the outer circumference of the cylindrical portion of the load-side bracket 40 with the conductive tape 50 interposed therebetween. The anti-load side elastic member 54 is cylindrical and closed at its anti-load-side end. The elastic member 54 is fitted and secured to the outer circumference of the cylindrical portion of the anti-load-side bracket 42, so that an anti-load-side opening of the bracket 42 is closed by the elastic member 54. The molded motor 1 of this preferred embodiment is mounted to another device with the elastic members 52 and 54 in contact with the other device, so that transmission of motor vibration to the other device can be prevented.

In the molded motor 1 of this preferred embodiment, the load-side bracket 40 made of metal and the anti-load-side bracket 42 made of metal are short-circuited to each other by the electrically conductive tape 50. Thus, potentials at the brackets 40 and 42 are equal to each other and no circulation current flows. Therefore, electrical erosion does not occur at the bearings 44 and 46. Moreover, the effect of preventing electrical erosion can be achieved by attaching the electrically conductive tape 50 on the outer surface of the motor frame 20. This structure is advantageous because the electrically conductive tape 50 does not obstruct other members and can be easily attached.

A preferred embodiment of the present invention is described above. However, the present invention is not limited to the above. For example, the electrically conductive member 50 for short-circuiting the brackets 40 and 42 to each other may be wire-shaped or plate-shaped.

The brackets 40 and 42 are preferably made of metal in the aforementioned preferred embodiment. However, the material of the brackets 40 and 42 is not limited thereto. Any material can be used for the brackets 40 and 42 as long as it is electrically conductive.

As described above, according to the preferred embodiments of the present invention, an inner rotor type molded motor can be provided which has a structure free from electrical erosion even if the molded motor is controlled by PWM control using an inverter circuit.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor including a center axis, the motor comprising:
    a stator including a stator core and a coil disposed around at least a portion of the stator core;
    a molded motor frame made of insulating resin and defining an outer circumferential surface of the motor;
    a rotor disposed on a center-axis side of the stator and including a shaft rotatable about the center axis;
    electrically conductive brackets disposed on both sides of the molded motor frame;
    bearings disposed on the brackets, respectively, and supporting the shaft of the rotor in a rotatable manner;
    an electrically conductive member electrically connected to the brackets to short-circuit the brackets to each other; and
    the electrically conductive member is disposed to extend along an outer circumferential surface of the molded motor frame.

2. A molded motor according to claim 1, wherein the electrically conductive member is an electrically conductive tape attached on the outer surface of the molded motor frame.

3. A molded motor according to claim 1, wherein the electrically conductive member is wire-shaped or plate-shaped.

4. A molded motor according to claim 1, wherein one of the brackets is at least partially embedded in the molded motor frame.

5. A molded motor according to claim 4, wherein the shaft of the rotor projects from the molded motor frame on a load side, and
    one of the brackets on the load side of the shaft is at least partially embedded in the molded motor frame.

6. A molded motor according to claim 1, wherein the molded motor frame is provided with a control circuit operable to supply electrical power from an external power supply to the coil of the stator.

7. A molded motor according to claim 6, wherein the control circuit is formed by one or more electric components formed on a wiring board, and
    both the stator and the control circuit are molded in the molded motor frame.

8. A molded motor according to claim 7, wherein the control circuit controls a current to the coil of the stator by pulse width modulation control.

9. A molded motor according to claim 1, wherein the electrically conductive brackets are made of metal.

* * * * *